US010317682B2

United States Patent
Drinkwater et al.

(10) Patent No.: US 10,317,682 B2
(45) Date of Patent: Jun. 11, 2019

(54) FRICTION JOINT FOR A HEAD MOUNTED DISPLAY

(71) Applicant: FACEBOOK TECHNOLOGIES, LLC, Menlo Park, CA (US)

(72) Inventors: Jared I. Drinkwater, Auburn, WA (US); Robin Michael Miller, Redmond, WA (US); Lesley Ribble Magrath, Seattle, WA (US); Boyd Drew Allin, Menlo Park, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 611 days.

(21) Appl. No.: 14/877,859

(22) Filed: Oct. 7, 2015

(65) Prior Publication Data

US 2017/0103573 A1 Apr. 13, 2017

(51) Int. Cl.
*G06F 3/01* (2006.01)
*G02B 27/01* (2006.01)

(52) U.S. Cl.
CPC ..... *G02B 27/0176* (2013.01); *G02B 27/0179* (2013.01); *G02B 2027/0154* (2013.01); *G02B 2027/0181* (2013.01); *G06F 3/011* (2013.01)

(58) Field of Classification Search
CPC .............. G02B 27/017; G02B 27/0176; G02B 27/0179; G02B 2027/0154; G02B 2027/0181; Y10T 403/32549; Y10T 403/32557; Y10T 403/32591; Y10T 16/5403; Y10T 16/54038; E05D 11/082
See application file for complete search history.

(56) References Cited

U.S. PATENT DOCUMENTS

| | | | | |
|---|---|---|---|---|
| 6,421,031 B1 * | 7/2002 | Ronzani | ............... | G02B 27/017 345/8 |
| 6,481,025 B2 * | 11/2002 | Hill | ........................ | A61F 9/025 2/453 |
| 6,609,273 B1 * | 8/2003 | Yamada | .................. | F16C 11/02 16/332 |
| 6,654,985 B1 * | 12/2003 | Lu | ............................ | E05D 5/14 16/338 |
| 6,892,393 B1 * | 5/2005 | Provost | .................. | A42B 3/185 2/10 |
| 7,380,312 B2 * | 6/2008 | Ge | ...................... | H04M 1/0216 16/296 |
| 7,500,288 B2 * | 3/2009 | Chung | .................. | E05D 11/082 16/342 |
| 7,814,579 B2 * | 10/2010 | Dion | ...................... | A42B 3/326 2/410 |
| 8,056,152 B2 * | 11/2011 | Brace | ...................... | A42B 3/225 2/410 |

(Continued)

FOREIGN PATENT DOCUMENTS

EP 1702527 A1 * 9/2006 ............. A42B 3/226

*Primary Examiner* — Jonathan P Masinick
(74) *Attorney, Agent, or Firm* — FisherBroyles, LLP

(57) ABSTRACT

Friction joints for use with head mounted displays are disclosed herein. In various embodiments, a head mounted display includes a front display module and a strap assembly. The strap assembly includes first and second connectors coupling the strap assembly to the front display module. The connectors allow the strap assembly to be moved toward and away from the front display module. The connectors are coupled to the front display module with first and second friction joints.

20 Claims, 5 Drawing Sheets

(56) References Cited

U.S. PATENT DOCUMENTS

| | | | | |
|---|---|---|---|---|
| 8,464,395 B2* | 6/2013 | Huang | G06F 1/1681 |
| | | | 16/342 |
| 8,567,021 B2* | 10/2013 | McCabe | A42B 1/004 |
| | | | 2/200.1 |
| 9,619,201 B2* | 4/2017 | Jannard | G02C 9/04 |
| 9,848,666 B1* | 12/2017 | Egeland | A42B 3/0433 |
| 2006/0206995 A1* | 9/2006 | Hong | A42B 3/226 |
| | | | 2/424 |
| 2006/0236504 A1* | 10/2006 | Lu | E05D 11/082 |
| | | | 16/342 |
| 2007/0124851 A1* | 6/2007 | Pyo | A42B 3/222 |
| | | | 2/424 |
| 2007/0174997 A1* | 8/2007 | Lu | B60R 11/0235 |
| | | | 16/367 |
| 2015/0074877 A1* | 3/2015 | Huh | A42B 3/225 |
| | | | 2/422 |
| 2016/0183623 A1* | 6/2016 | Didier | A42B 3/225 |
| | | | 2/421 |
| 2017/0265590 A1* | 9/2017 | Burns | A43C 11/165 |
| 2017/0325534 A1* | 11/2017 | Noordzij | A42B 3/222 |
| 2017/0364144 A1* | 12/2017 | Petrov | G06F 3/012 |
| 2018/0027916 A1* | 2/2018 | Smallwood | A42B 3/223 |
| 2018/0055130 A1* | 3/2018 | Egeland | A42B 3/046 |

\* cited by examiner

FRICTION JOINT FOR A HEAD MOUNTED DISPLAY

TECHNICAL FIELD

This patent application is directed to head mounted displays and, more specifically, to head mounted displays with strap assemblies.

BACKGROUND

Head mounted displays (HMDs) are generally configured to be worn on a user's head and positions over a portion of a user's face. HMDs often include a front display module and are secured in position with a strap assembly. There is a need for a versatile HMD that allows the front display module to be positioned in various positions with respect to the user's face and/or strap assembly.

BRIEF DESCRIPTION OF THE DRAWINGS

Embodiments of a head mounted display (HMD) with straps and one or more the friction joints introduced herein may be better understood by referring to the following Detailed Description in conjunction with the accompanying drawings, in which like reference numerals indicate identical or functionally similar elements.

Figure 1:
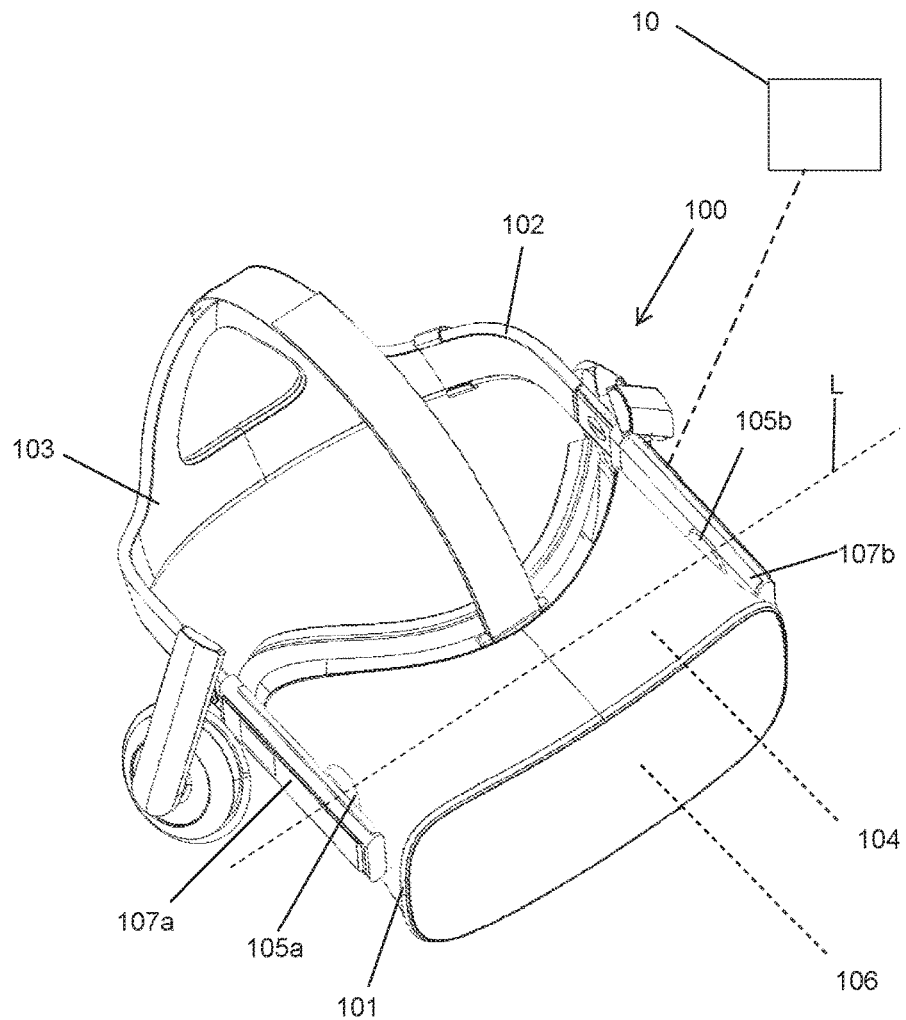
FIG. 1 is an isometric view of a HMD in accordance with an embodiment of the present technology.

The headings provided herein are for convenience only and do not necessarily affect the scope or meaning of the claimed embodiments. Further, the drawings have not necessarily been drawn to scale. For example, the dimensions of some of the elements in the figures may be expanded or reduced to help improve the understanding of the embodiments. Moreover, while the disclosed technology is amenable to various modifications and alternative forms, specific embodiments have been shown by way of example in the drawings and are described in detail below. The intention, however, is not to limit the embodiments described. On the contrary, the embodiments are intended to cover all modifications, equivalents, and alternatives falling within the scope of the embodiments.

DETAILED DESCRIPTION

Overview

A HMD with a front display module coupled to a strap assembly with a friction joint is disclosed. The friction joint has a first portion connected to the front display module and a second portion that adjustably mates with the first portion connected to the adjustable strap assembly. The front display module can be rotated about the friction joint relative to the strap assembly and a user's face when in use to a desired position and maintained in that position via the friction joint.

General Description

Various examples of the devices introduced above will now be described in further detail. The following description provides specific details for a thorough understanding and enabling description of these examples. One skilled in the relevant art will understand, however, that the techniques discussed herein may be practiced without many of these details. Likewise, one skilled in the relevant art will also understand that the technology can include many other features not described in detail herein. Additionally, some well-known structures or functions may not be shown or described in detail below so as to avoid unnecessarily obscuring the relevant description.

The terminology used below is to be interpreted in its broadest reasonable manner, even though it is being used in conjunction with a detailed description of some specific examples of the embodiments. Indeed, some terms may even be emphasized below; however, any terminology intended to be interpreted in any restricted manner will be overtly and specifically defined as such in this section.

FIG. 1 is an isometric view of a HMD 100 in accordance with an embodiment of the present technology. The HMD 100 is configured for use with a virtual reality system 10, which may include a conventional virtual reality system. The HMD 100 includes a front display module 101 and a strap assembly 103 operatively coupled to the front display module 101 with a friction joint 105. The front display module 101 contains optics 104 and one or more displays 106 operatively coupleable to the virtual reality system 10. The strap assembly 103 includes one or more head straps 102 and a pair of substantially rigid connector arms 107 (identified individually as a first connector arm 107a and a second connector arm 107b) connected to the head straps 102 at opposing sides of the strap assembly 103.

The stiff connector arms 107 couple the strap assembly 103 to opposing lateral sides of the front display module 101 at respective friction joints 105 (identified individually as a first friction joint 105a and a second friction joint 105b). The connector arms 107 are adjustable to allow a user to adjust the shape and/or size of the strap assembly 103 relative to the front display module 101 to properly fit the shape and size of the user's head and to securely and comfortably retain the front display module 101 adjacent the front of the user's face and over the user's eyes. The friction joints 105 on opposing sides of the front display module 101 allow a user to rotate (e.g., tilt, pivot, etc.) the front display module 101 to one or more selected positions (e.g., angles) relative to the strap assembly 103 and user's head. The friction joints 105 retain the front display module 101 via frictional engagement at the selected position until the user tilts or otherwise re-adjusts the front display module 101 to a different selected position relative to the strap assembly 103 and a user's face. The front display module 101 can be rotated about a longitudinal axis of rotation (identified by broken line L) extending through a center of the first and second friction joints 105a and 105b, respectively. The substantially rigid connector arms 107 do not substantially flex and they react the torsional load generated as the frictional forces in the friction joints are overcome when the front display module 101 is rotated relative to the strap assembly 103. In one embodiment, the connector arms 107 can be axially extendible or adjustable while being substantially torsionally rigid or stiff.

Each of the first and second friction joints 105a and 105b include first and second portions 109 and 111, respectively, configured to adjustably mate with each other. The mating first and second portions 109 and 111 have a friction fit between them. The friction fit, as described in more detail below, allows the first and second portions 109 and 111 to rotate relative to each other while having a sufficient frictional engagement and retention force between them such that the front display module 101 can remain in a selected fixed position (e.g., maintained an angle of tilt) relative to the strap assembly 103 and a user's face. Accordingly, the frictional forces provided in the friction joints are sufficient to withstand movement of the front display module due to gravitational forces and normal torsional loads experiences at the front display module during typical active use by the user and motion of the user's head. When a user manually applies an adjustment force greater than the friction forces between the first and second portions 109 and 111 of each friction joint 105 (e.g., to overcome the friction forces), the resistance by the friction joints is overcome and the front display module 101 can be manually rotated to another position selected by the user. When the manual rotational force applied by the user to the front display module 101 is released or is less than the frictional force in the friction joints 105, the front display module 101 is again maintained in the selected position relative to the strap assembly 103 and a user's face.

Figure 2A:
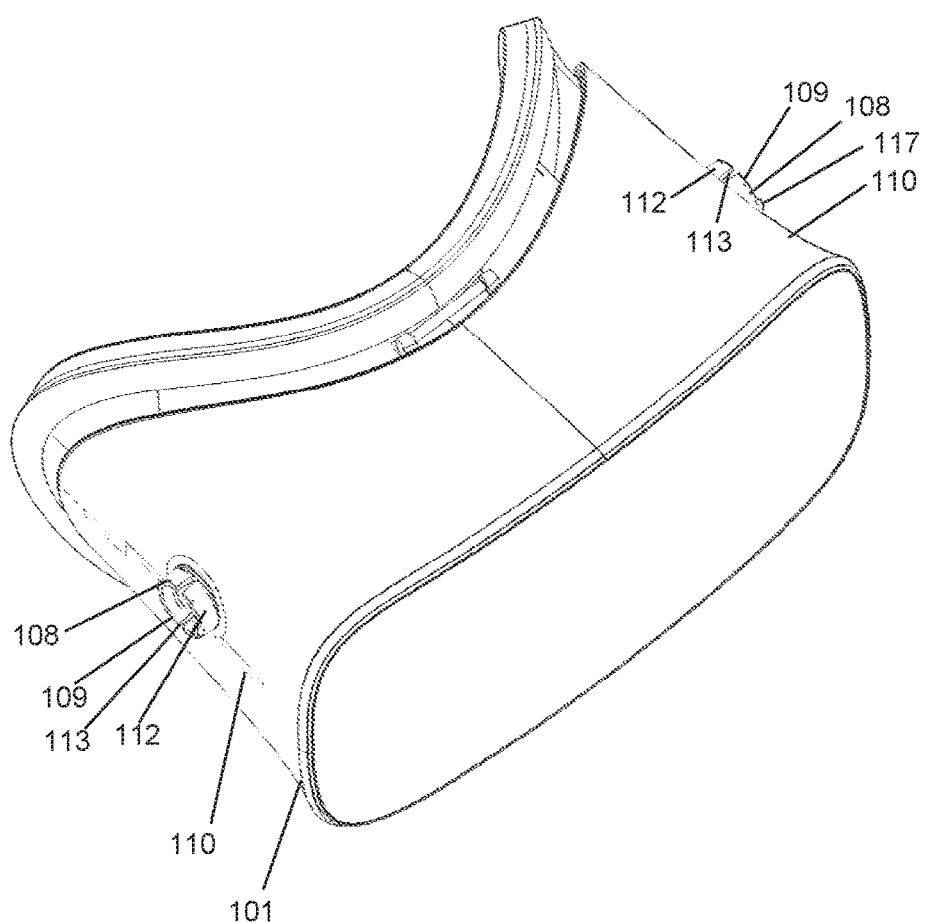
FIG. 2A is an isometric view of a portion of a front display module of the HMD of FIG. 1 with a strap assembly and other components removed for clarity.

FIG. 2A shows the front display module 101 of the HMD 100 of FIG. 1 with the strap assembly 103 not shown for simplicity. As noted above, each of the friction joints 105 includes a first portion 109 positioned on a respective opposing lateral side portion 110 of the front display module 101 and extend laterally outward away from the associated lateral side portion 110. In some embodiments, the first portions 109 are integrally formed with the lateral side portions 110. In other embodiments, the first portions 109 are separate components connected to or otherwise assembled with the lateral side portions of the front display module 101. As illustrated in FIG. 2A, in some embodiments, each first portion 109 is formed by a pair of substantially semi-annular flanges 108 that together have an outer substantially cylindrical exterior engagement surfaces 112 with an outer diameter so as to form a male component (e.g., connectors, protrusions, projections) of the friction joints 105. The first portion 109 can be received via tight friction fit within a corresponding receptacle 114 or female fitting of the mating second portion 111, as described in more detail below, to form the respective friction joint 105. In other embodiments, the first portion 109 can form the female fitting and the second portion 111 can form the male fitting of the respective friction joint 105.

Figure 2B:
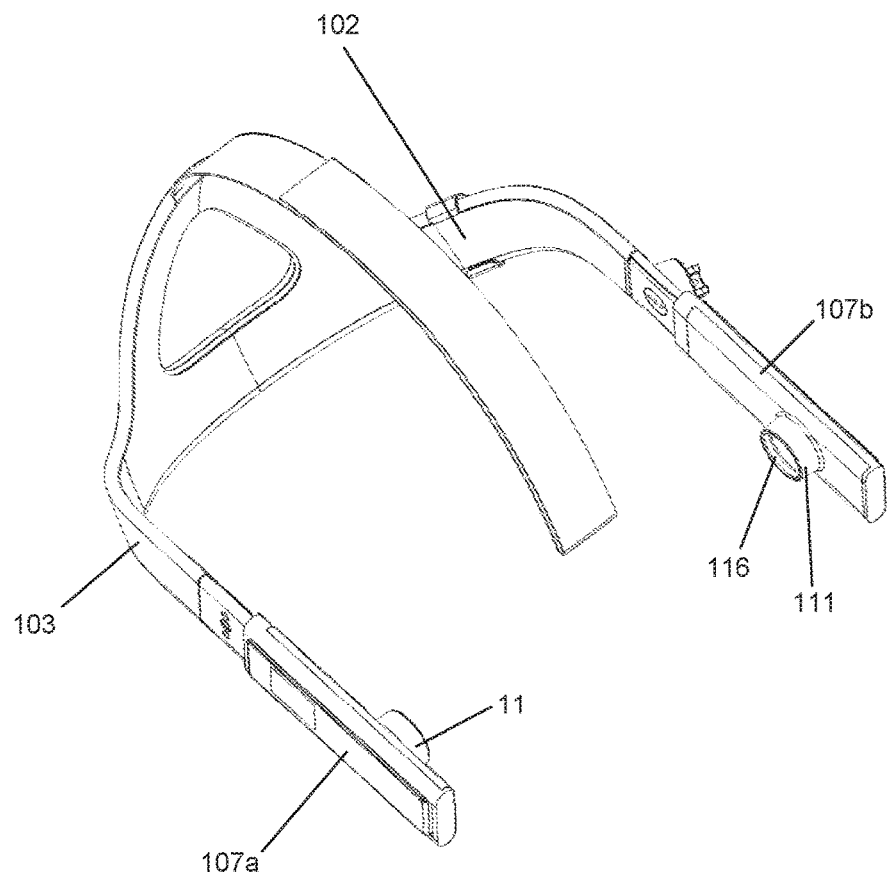
FIG. 2B is an isometric view of a portion of a strap assembly of the HMD of FIG. 1 with the front display module and other components removed for clarity.

FIG. 2B shows the strap assembly 103 of the HMD 100 of FIG. 1 with the front display module 101 not shown for simplicity. As noted above, each of the friction joints 105 include a second portion 111 positioned on a respective opposing lateral end portion of the connector arms 107a/107b of the strap assembly 103 and extend laterally inwardly toward each other. In some embodiments, the second portions 111 are integrally formed with the connector arms 107. In other embodiments, the second portions 111 are separate components connected to or otherwise assembled with the connectors 107. In some embodiments, each second portion 111 is a substantially cylindrical member having an interior engagement surface 116 with an inner diameter so as to define the receptacle 114 or female fitting (e.g., connectors, protrusions, projections) of the respective friction joint 105. The inner diameter of the interior engagement surface 116 approximately corresponds to the outer diameter of the cylindrical exterior engagement surfaces of the first portion (FIG. 2A). The second portion 111 closely receives the corresponding first portion 109 on the front display module 101 (FIG. 2A) such that the interior engagement surface directly engages the exterior engagement surfaces via a snug friction fit to form the respective friction joint 105 between the front display module 101 and the strap assembly 103. While the first and second portions 109 and 111 are illustrated as annular flanges, in other embodiments, the first and second portions 109 and 111 can be formed into other suitable shapes. In other embodiments, for example, the first and second portions can have a ball and socket configuration, a truncated conical configuration for a wedged interface, etc., to form the friction joints 105.

The first and second portions 109 and 111 of the friction joint 105 can be made of a common material, such as plastic, composite, metal, or other suitable material with a sufficient coefficient of friction to maintain the frictional engagement within the friction joint 105 during use of the HMD 100. In other embodiments, the first and second portions 109 and 111 can be made of different materials. In yet other embodiments, the first and/or second portions 109 and 111 can include one or more frictional enhancing members, such as a partially compressible ring or other surface between the mating first and second portions 109 and 111 to provide the desired frictional retention forces to hold the front display module 101 in the selected position relative to the strap assembly 103. In another embodiment, the first and/or second portions 109 and 111 can include one of a plurality of removable frictional enhancing members with different coefficients of friction or other frictional characteristics between the mating first and second portions 109 and 111 to allow a user to adjust the friction joints 105 to increase or decrease the joints' resistance to manual rotation.

Figure 3A:
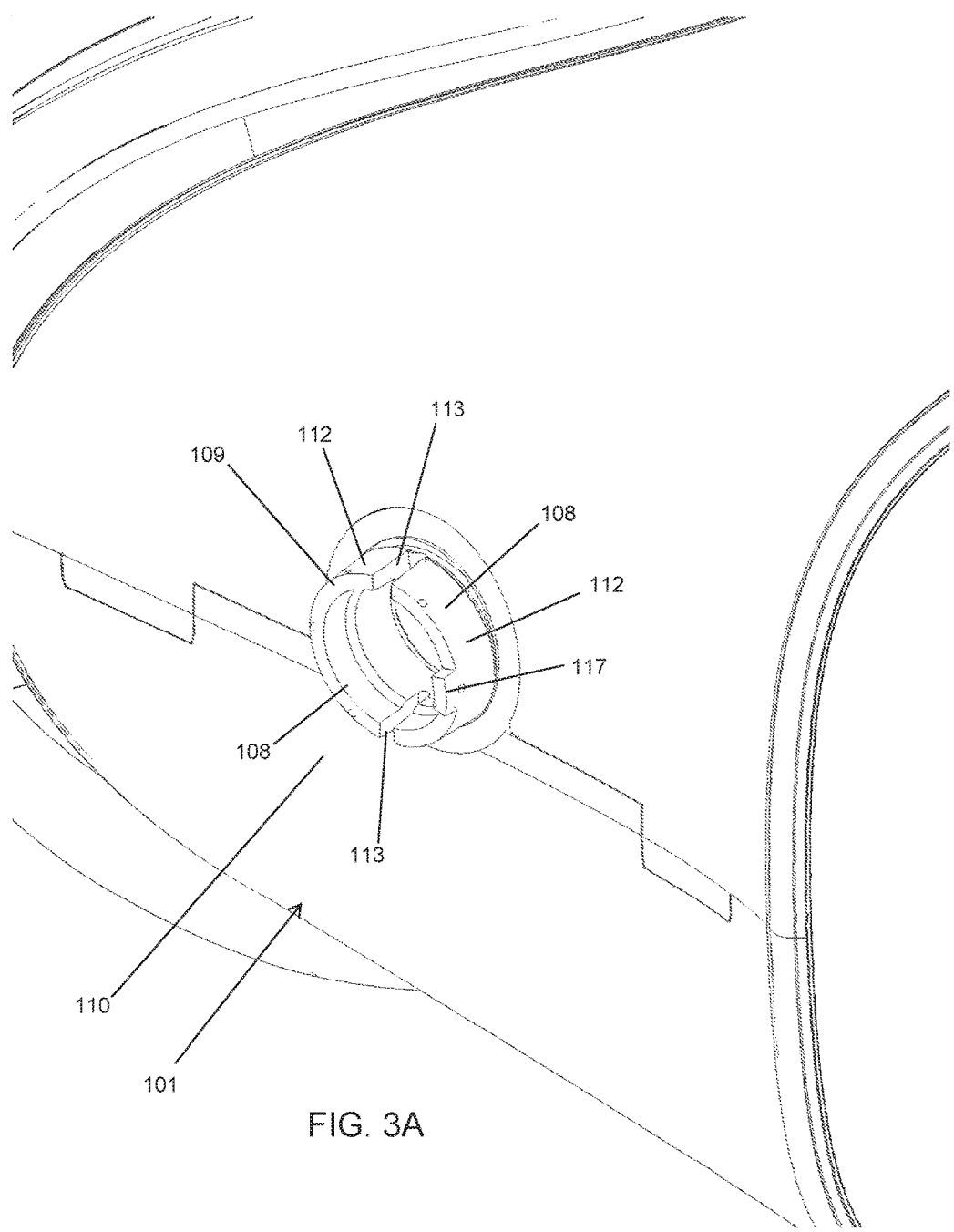
FIG. 3A is an enlarged isometric view of a portion of a friction joint of the front display module of FIG. 2A configured in accordance with an embodiment of the present technology.
Figure 3B:
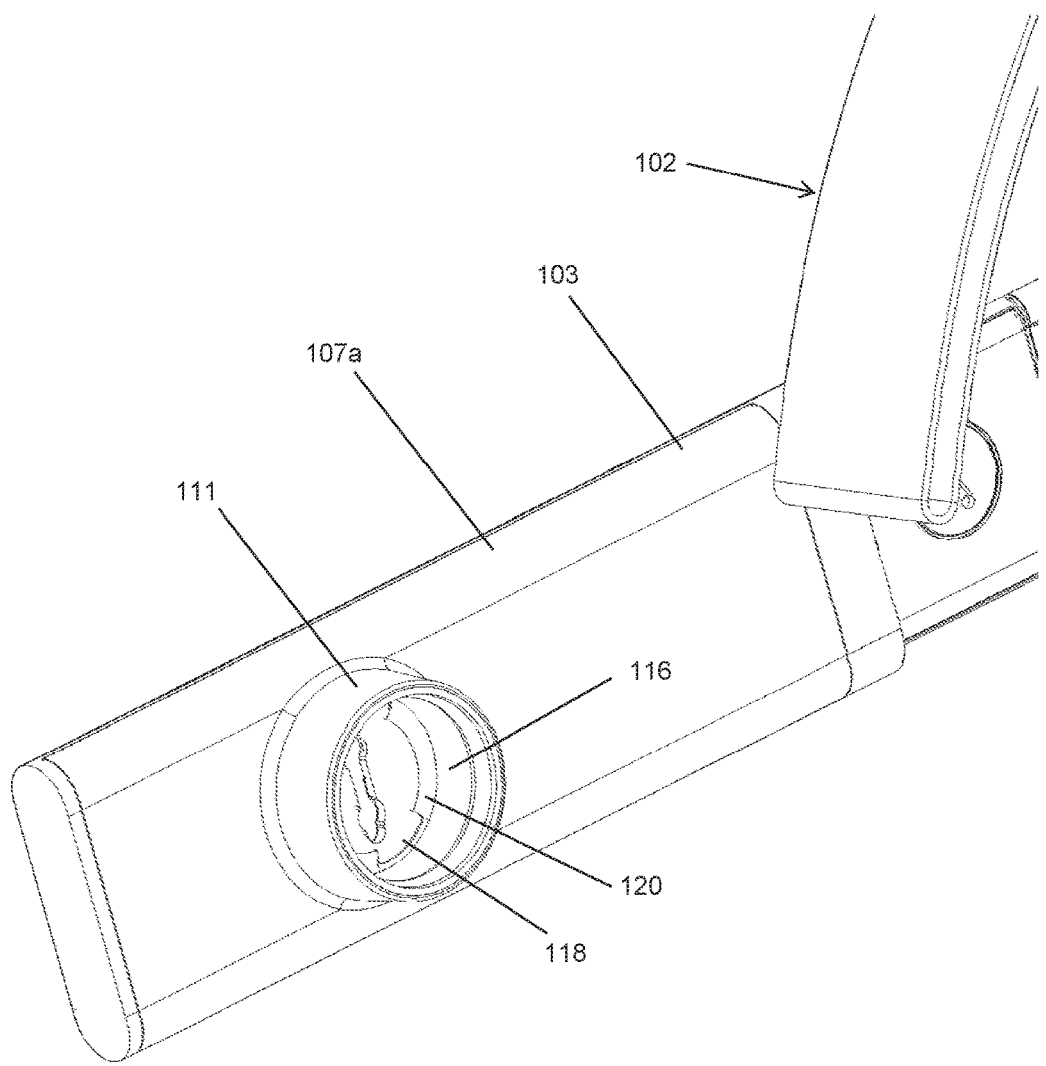
FIG. 3B is an enlarged isometric view of a portion of a friction joint of the strap assembly of FIG. 2B configured in accordance with an embodiment of the present technology.

FIGS. 3A and 3B are enlarged isometric views of the mating first and second portions 109 and 111, respectively, that form the friction joint 105a in accordance with an embodiment of the present technology. As illustrated, the illustrated first portion 109 can be configured to be partially compressible or elastically deformable in the radial direction. In some embodiments, the first portion 109 includes one or more slots 113 (e.g., recesses, openings, apertures, gaps, apertures, cut-away portions) between the semi-annular flanges 108 to allow the first portion 109 to partially deflect radially inwardly as it is axially received by the second portion 111 (FIG. 3B) to form the friction joint 105 with the secure friction fit.

In the illustrated embodiment, the first portion 109 (FIG. 3A) has a tab 117 extending axially outwardly from a portion of the flanges 108. The second portion 111 (FIG. 3B) has a mating arcuate slot 118 formed in an annular interior back wall 120, and the slot 118 is positioned to receive the tab 117 when the first and second portions 109 and 111 are mated together. The slot 118 is sized a positioned to define limits for rotation of the first portion 109, and thus limiting rotational movement of the front display model 101 relative to the strap assembly 103 (FIG. 1). Accordingly, if the tab 117 moves radially to either end of the slot 118, the back wall will block the tab 117 from further radial movement, thereby blocking further rotational movement of the front display model 101 relative to the strap assembly 103. Although the illustrated embodiment is shown with one tab 117 on each first portion 109, other embodiments can have two or more tabs 117 on the first portion 109 and a corresponding number of slots 118 in mating second portion 111.

The friction joints 105 allow the front display module 101 to be rotated. Accordingly, an angle of tilt between a user's face and the front display module 101 can be adjusted. Being able to adjust an angle of the front display module 101 relative to a user's face is expected to provide a user with increased comfort when wearing the HMD 100 as force from the strap assembly 103 can be better distributed between a user's cheeks and forehead at different angles for users having different shaped and sized faces. Further, light bleed through spaces or gaps between a user's face and the front display module 101 can be substantially reduced or eliminated as the front display module 101 can be rotated relative to a user's face to accommodate various face sizes and shapes. Additionally, the friction joints 105 not only allow the front display module 101 to be rotated to various desired positions relative to a user's face, but also they allow the front display module to be maintained in those positions once a desired position is reached.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. It will be appreciated that the same thing can be said in more than one way. Consequently, alternative language and synonyms may be used for any one or more of the terms discussed herein, and any special significance is not to be placed upon whether or not a term is elaborated or discussed herein. Synonyms for some terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification. Unless otherwise defined, all technical and scientific terms used herein have the same meaning as commonly understood by one of ordinary skill in the art to which this disclosure pertains. In the case of conflict, the present document, including definitions, will control.

We claim:

1. A head mounted display for use with a virtual reality system, comprising:
   a front display module shaped to rest against a forehead region and a cheek region of a user's face, the front display module comprising:
      a display housing shaped to substantially eliminate light bleed from external light sources from reaching the user's eyes and having opposing lateral sides each having a first frictional joint member;
      optics housed within the display housing between the opposing lateral sides; and
      one or more virtual-reality displays housed within the display housing between the opposing lateral sides and coupleable to the virtual reality system; and
   an adjustable strap assembly configured to apply, when worn by the user, a retaining force to the front display module, the adjustable strap assembly comprising:
      one or more head straps; and
      opposing first and second connector arms connected to the one or more head straps and positioned adjacent to the lateral sides of the front display module, each of the first and second connector arms having a second frictional joint member attached to a respective one of the first frictional joint member and pivotal about an axis of rotation relative to the respective one of the first frictional joint member;
   wherein the front display module is pivotally movable about the axis of rotation relative to the strap assembly between first and second positions, and wherein frictional engagement between the first and second frictional joint members retains the front display module in the first selected position while the retaining force applied by the adjustable strap assembly retains the front display module against the forehead region and the cheek region of the user's face until the front display module is manually moved away from the first selected position toward the second position.

2. The head mounted display of claim 1 wherein:
   the first frictional joint members project outwardly away from the respective lateral sides; and
   the second frictional joint members project inwardly toward each other and into engagement with the first frictional joint members.

3. The head mounted display of claim 1 wherein:
   the first frictional joint members comprise an outer exterior engagement surface having one of a ball shape or a truncated conical shape for a wedged interface; and
   the second frictional joint members comprise an inner exterior engagement surface having one a socket shape or a corresponding truncated conical shape for the wedged interface.

4. The head mounted display of claim 1 wherein:
   the first frictional joint members:
      are substantially cylindrical male connection members; and
      comprise slots allowing the cylindrical male connection members to partially deflect radially inwardly when the cylindrical male connection members are axially received by the second frictional joint members; and
   the second frictional joint members are female connection members each having a substantially cylindrical receptacle that receives a respective one of the male connection members with the frictional engagement therebetween.

5. The head mounted display of claim 1 wherein at least one of the first frictional joint members comprises a pair of coaxial, substantially semi-cylindrical flange portions separated by a gap therebetween, wherein the flange portions are radially deflectable relative to each other when received by a respective one of the second frictional joint members, and wherein radial deflection of the flange portions causes the frictional engagement between the first and second frictional joint members.

6. The head mounted display of claim 1 wherein at least one of the first frictional joint members comprises a pair of coaxial, substantially semi-cylindrical flange portions separated by a gap therebetween, wherein the flange portions have an outer curvilinear engagement surface that frictionally engages a mating inner curvilinear engagement surface of a respective one of the second frictional joint members, and wherein frictional engagement of the outer curvilinear engagement surface and the mating inner curvilinear engagement surface retains the front display module in the first selected position and the second selected position.

7. The head mounted display of claim 1 wherein the second frictional joint members are substantially cylindrical male connection members, and the first frictional joint members are female connection members each having a substantially cylindrical receptacle that receives a respective one of the male connection members with the frictional engagement therebetween.

8. The head mounted display of claim 1 wherein at least one of the first or second frictional joint members comprises one or more frictional enhancing members, the one or more frictional enhancing members comprising one or more of:
a partially compressible ring positioned between one of the first frictional joint members and a respective one of the second frictional joint members; or
one of a plurality of removable frictional enhancing members with different coefficients of friction.

9. The head mounted display of claim 1 wherein at least one of the first frictional joint members has a rotational stop member positioned to engage a portion of a mating one of the second frictional joint members to limit rotational movement of the at least one of the first frictional joint members relative to the mating one of the second frictional joint members.

10. The head mounted display of claim 9 wherein the rotational stop member is a tab positioned in an arcuate slot in the mating one of the second frictional joint members.

11. The head mounted display of claim 10 wherein at least one of the first frictional joint members comprises a pair of coaxial, substantially semi-cylindrical flange portions separated by a gap therebetween, wherein the tab extends axially outward from one of the flange portions, and wherein the arcuate slot is formed in an annular interior back wall of the mating one of the second frictional joint members.

12. The head mounted display of claim 11 wherein the first and second connector arms are axially extendible.

13. A head mounted display for use with a virtual reality system, comprising:
a front display module shaped to rest against a forehead region and a cheek region of a user's face, the front display module comprising:
a display housing shaped to substantially eliminate light bleed from external light sources from reaching the user's eyes;
optics housed within the display housing; and
one or more virtual-reality displays housed within the display housing and coupleable to the virtual reality system; and
a friction joint coupling the display housing to a head mountable strap assembly configured to apply, when worn by the user, a retaining force to the front display module, the friction joint having an axis of rotation and configured to allow the front display module to rotate about the axis of rotation, wherein the friction joint comprises a male fitting and a female fitting secured together via a friction fit while the retaining force applied by the head mountable strap assembly retains the front display module against the forehead region and the cheek region of the user's face.

14. The head mounted display of claim 13 wherein the front display module is pivotal relative to the strap assembly between first and second positions, the front display module in the first position is positioned at a first angle relative to the face of the user wearing the head mounted display, and the front display module in the second position is positioned at a second angle relative to the face of the user, the second angle being different from the first angle, and wherein the front display module is maintained in the second position via the friction joint while the retaining force applied by the head mountable strap assembly retains the front display module against the forehead region and the cheek region of the user's face.

15. The head mounted display of claim 14 wherein the front display module is pivotal between the first and second positions by applying a rotational force greater than a friction force provided by the friction fit between the male fitting and the female fitting.

16. The head mounted display of claim 13 wherein the male and female fittings include corresponding annular flanges configured to mate with each other via the friction fit.

17. The head mounted display of claim 13 wherein at least one of the male and female fittings includes an elastically deformable material.

18. A method of positioning a head mounted display for use with a virtual reality system, the method comprising:
providing a front display module and a strap assembly, wherein:
the front display module is shaped to rest against a forehead region and a cheek region of a user's face and comprises a display housing shaped to substantially eliminate light bleed from external light sources from reaching the user's eyes, optics housed within the display housing, and one or more virtual-reality displays housed within the display housing and coupleable to the virtual reality system, the front display module being positionable adjacent to the user's face; and
the strap assembly is configured to apply, when worn by the user, a retaining force to the front display module;
coupling the front display module to the strap assembly via a friction joint, the friction joint comprising:
a first portion positioned on the strap assembly and a second portion positioned on the front display module, wherein the first portion and second portion are configured to be secured together via a friction fit while the retaining force applied by the strap assembly retains the front display module against the forehead region and the cheek region of the user's face and being rotational relative to each other about an axis of rotation; and
pivoting the front display module relative to the strap assembly about the axis of rotation for adjustment of the front display module adjacent to the user's face.

19. The method of claim 18 wherein pivoting the front display module relative to the strap assembly includes pivoting the front display module from a first position to a second position by applying a force greater than a friction force provided at the friction joint between the first and second portions.

20. The method of claim 18 wherein coupling the front display module to the strap assembly includes securing the first portion to the second portion.

* * * * *